United States Patent [19]
Fischer

[11] 3,898,072
[45] Aug. 5, 1975

[54] HERBICIDE

[75] Inventor: Adolf Fischer, Mutterstadt, Germany

[73] Assignee: Badische Anilin- & Soda-Fabrik Aktiengesellschaft, Ludwigshafen (Rhine), Germany

[22] Filed: Apr. 4, 1973

[21] Appl. No.: 348,085

[30] Foreign Application Priority Data
Apr. 13, 1972 Germany............................ 2217698

[52] U.S. Cl. ........................... 71/88; 71/92; 71/111
[51] Int. Cl.............................................. A01n 9/22
[58] Field of Search.................................. 71/88, 92

[56] References Cited
UNITED STATES PATENTS
3,689,507   9/1972   Gates et al.............................. 71/92
3,810,751   5/1974   Fischer et al. .......................... 71/92

*Primary Examiner*—Lewis Gotts
*Assistant Examiner*—Catherine L. Mills
*Attorney, Agent, or Firm*—Johnston, Keil, Thompson & Shurtleff

[57] ABSTRACT

New and valuable herbicide comprising a composition of several active ingredients.

13 Claims, No Drawings

HERBICIDE

The present invention relates to a herbicide comprising a composition of a methane sulfonate and a pyridazone, uracil or carbamate.

It is known to use methane sulfonates, pyridazones, uracils and carbamates for controlling broadleaved and grassy weeds. However, their action is poor.

I have now found that a composition of
a. a compound of the formula

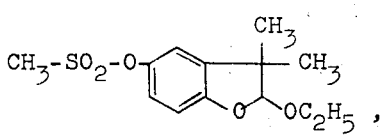

and
b. a compound of the formula

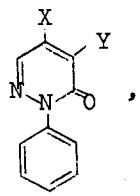

where Y denotes chloro or bromo, X denotes amino, NH—CHOH—CCl$_3$ or —NH—CO—COOR, R denoting lower alkyl of a maximum of 4 carbon atoms or hydrogen, or its alkali metal or alkaline earth metal salts or its salts with substituted amines (ammonium, hydroxyalkylammonium, alkylammonium and hydrazine salts, e.g., salts with sodium, lithium, potassium, calcium, iron methylammonium, trimethylammonium, ethylammonium, diethanolammonium, ethanolammonium, dimethylamine, dimethylethanolamine, hydrazine and phenylhydrazine) or
c. a compound of the formula

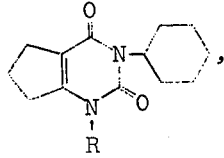

where R denotes hydrogen, acetyl, propionyl or α,α-dimethyl-β-acetoxypropionyl or
d. a compound of the formula

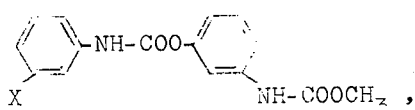

where X denotes hydrogen or lower alkyl of a maximum of 3 carbon atoms, has a good herbicidal action.

The active ingredients may be mixed in any ratio; it is however preferred to employ a ratio (by weight) of a : b or c or d of from 5 : 1 to 1 : 5, preferably 3 : 1 to 1 : 3.

The agents according to the invention may be used as solutions, emulsions, suspensions, oil dispersions, granules or dusts. The form of application depends entirely on the purpose for which the agents are being used; in any case it should ensure a fine distribution of the active ingredient.

For the preparation of solutions to be sprayed direct, mineral oil fractions of medium to high boiling point, such as kerosene or diesel oil, further coal-tar oils and oils of vegetable or mineral origin, and cyclic hydrocarbons such as tetrahydronaphthalene and alkylated naphthalenes are suitable.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g., polyethylene oxide adducts. Concentrates which are suitable for dilution with water may be prepared from active ingredient, wetting agent, adherent, emulsifying or dispersing agent and possibly solvent. Oils of various types may be added to ready-to-use spray liquors.

Dusts may be prepared by mixing or grinding the active ingredients with a solid carrier, e.g., kieselguhr, talc, clay or fertilizers.

Granules may be prepared by bonding the active ingredients to solid carriers.

Directly sprayable dispersions may also be prepared with oils.

The new compounds may be mixed with fertilizers, insecticides, fungicides and other herbicides.

The new herbicides may be applied either pre- or post-emergence, and are particularly suited for controlling dicotyledonous seed weeds and monocotyledonous seed grasses in crops such as beet, spinach, potatoes, peas, beans and groundnuts.

EXAMPLE 1

In the greenhouse, loamy sandy soil was filled into pots and sown with beet (*Beta vulgaris*), Indian corn (*Zea mays*), common lambsquarters (*Chenopodium album*), wild mustard (*Sinapis arvensis*), smallflower galinsoga (*Galinsoga parviflora*), slender foxtail (*Alopercurus myosuroides*), wild oat (*Avena fatua*), and barnyard grass (Echinochloa crus-galli). Subsequently the soil prepared in this manner was treated with the following amounts of the following active ingredients and compositions thereof, each active ingredient and each composition being emulsified or dispersed in 500 liters of water per hectare:

I: 2-ethoxy-2,3-dihydro-3,3-dimethyl-5-benzofuranylmethane sulfonate, 1, 1.5, 3 and 4 kg/hectare;
II: 1-phenyl-4-amino-5-chloropyridazone-(6), 3 and 4 kg/hectare;
III: 1-phenyl-4-(α-hydroxy-β,β,β-trichloroethyl)-amino-5-bromopyridazone-(6), 1.5 and 3 kg/hectare;
I+II: 1 + 3 kg/hectare;
I+III: 1.5 + 1.5 kg/hectare.

The results given below show that the overall action of the compositions is superior to that of their individual components.

| Active ingredient kg/ha | I 1.5 | 3 | 4 | II 3 | 4 | III 1.5 | 3 | I+II 1+3 | I+III 1.5+1.5 |
|---|---|---|---|---|---|---|---|---|---|
| Beta vulgaris | 0 | 5 | 20 | 30 | 0 | 15 | 0 | 5 | 0 | 
| Zea mays | 0 | 0 | 15 | 35 | 0 | 15 | 5 | 15 | 0 | 5 |
| Chenopodium album | 10 | 30 | 40 | 60 | 50 | 65 | 60 | 100 | 90 | 100 |
| Sinapis arvensis | 10 | 15 | 45 | 50 | 50 | 80 | 55 | 100 | 95 | 95 |
| Galinsoga parviflora | 10 | 20 | 40 | 60 | 40 | 70 | 50 | 100 | 80 | 90 |
| Alopecurus myosuroides | 45 | 65 | 100 | 100 | 30 | 50 | 40 | 90 | 100 | 100 |
| Avena fatua | 40 | 60 | 100 | 100 | 20 | 30 | 30 | 70 | 95 | 100 |
| Echinochloa crus-galli | 50 | 70 | 100 | 100 | 20 | 30 | 30 | 75 | 95 | 100 |

0 = no damage
100 = complete destruction

EXAMPLE 2

In the greenhouse, seeds of beet (Beta vulgaris), common lambsquarters (Chenopodium album), wild mustard (Sinapis arvensis), slender foxtail (Alopecurus myosuroides) and wild oat (Avena fatua) were sown in loamy sandy soil and subsequently treated with the following amounts of the following active ingredients and compositions thereof, each active ingredient and each composition being emulsified or dispersed in 500 liters of water per hectare:

I: 2-ethoxy-2,3-dihydro-3,3-dimethyl-5-benzofuranylmethane sulfonate, 1.5, 2 and 3 kg/hectare;

II: 1-(α, α-dimethyl-β-acetoxypropionyl)-3-cyclohexyl-5,6-trimethylene uracil, 1.5 and 3 kg/hectare;

III: 3-cyclohexyl-5,6-trimethylene uracil, 1.5 and 3 kg/hectare;

I+II: 1.5 + 1.5 kg/hectare;

I+III: 1.5 + 1.5 kg/hectare.

The following results show that the compositions have a better herbicidal action than their individual components, combined with good crop plant compatibility.

foxtail (Alopecurus myosuroides), and annual bluegrass (Poa annua) were treated at a growth height of 3 to 13 cm with the following amounts of the following active ingredients and compositions thereof, each active ingredient and each composition being emulsified or dispersed in 500 liters of water per hectare:

I: 2-ethoxy-2,3-dihydro-3,3-dimethyl-5-benzofuranylmethane sulfonate, 0.5, 1, 1.5, 2 and 3 kg/hectare;

II: 3-methoxycarbonylaminophenyl-N-(3'-methylphenyl)-carbamate, 1 and 2 kg per hectare;

III: 1-phenyl-4-amino-5-chloropyridazone-(6), 2 and 3 kg per hectare;

IV: 1-phenyl-4-(α-hydroxy-β,β,β-trichloroethyl)-amino-5-bromopyridazone-(6), 1.5 and 2 kg/hectare;

V: 1-(α,α-dimethyl-β-acetoxypropionyl)-3-cyclohexyl-5,6-trimethylene uracil, 0.5 and 2 kg/hectare;

VI: 3-cyclohexyl-5,6-trimethylene uracil, 1 and 2 kg/hectare;

I+II: 1 + 1 kg/hectare;
I+III: 1 + 2 kg/hectare;
I+IV: 0.5 + 1.5 kg/hectare;
I+V: 1.5 + 0.5 kg/hectare;
I+VI: 1 + 1 kg/hectare.

| Active ingredient kg/ha | I 1.5 | 2 | 3 | II 1.5 | 3 | III 1.5 | 3 | I+II 1.5+1.5 | I+III 1.5+1.5 |
|---|---|---|---|---|---|---|---|---|---|
| Beta vulgaris | 5 | 10 | 20 | 0 | 30 | 0 | 40 | 5 | 5 |
| Chenopodium album | 20 | 30 | 40 | 45 | 90 | 35 | 90 | 95 | 85 |
| Sinapis arvensis | 15 | 20 | 35 | 50 | 95 | 40 | 100 | 95 | 80 |
| Alopecurus myosuroides | 65 | 85 | 100 | 30 | 75 | 25 | 75 | 100 | 100 |
| Avena fatua | 60 | 80 | 100 | 25 | 55 | 20 | 70 | 100 | 95 |

0 = no damage
100 = complete destruction

EXAMPLE 3

The plants beet (Beta vulgaris), common lambsquarters (Chenopodium album), chamomile (Matricaria chamomilla), wild mustard (Sinapis arvensis), slender After 2 to 3 weeks it was ascertained that the compositions had a better herbicidal action than their individual components, combined with good crop plant compatibility.

The results are given below:

| Active ingredient kg/ha | 0.5 | 1 | I 1.5 | 2 | 3 | 1 | II 2 | III 2 | 3 | IV 1.5 | 2 |
|---|---|---|---|---|---|---|---|---|---|---|---|
| Beta vulgaris | 0 | 0 | 5 | 20 | 30 | 0 | 20 | 0 | 0 | 0 | 0 |
| Chenopodium album | 10 | 20 | 35 | 50 | 70 | 80 | 100 | 65 | 90 | 60 | 85 |
| Matricaria chamomilla | 20 | 30 | 50 | 70 | 90 | 35 | 80 | 60 | 90 | 65 | 90 |
| Sinapis arvensis | 10 | 20 | 40 | 60 | 90 | 75 | 100 | 50 | 85 | 60 | 80 |
| Alopecurus myosuroides | 30 | 50 | 60 | 100 | 100 | 10 | 15 | 40 | 80 | 40 | 50 |
| Poa annua | 25 | 45 | 55 | 90 | 100 | 10 | 20 | 35 | 75 | 45 | 60 |

-Continued

| Active ingredient | V | | VI | | I+I | I+III | I+IV | I+V 1.5+ | I+VI |
|---|---|---|---|---|---|---|---|---|---|
| kg/ha | 0.5 | 2 | 1 | 2 | 1+1 | 1+2 | 0.5+1.5 | 0.5 | 1+1 |
| Beta vulgaris | 0 | 20 | 5 | 25 | 0 | 0 | 0 | 5 | 5 |
| Chenopodium album | 30 | 100 | 50 | 100 | 100 | 100 | 100 | 95 | 95 |
| Matricaria chamomilla | 35 | 95 | 40 | 90 | 100 | 100 | 95 | 100 | 100 |
| Sinapis arvensis | 40 | 100 | 65 | 100 | 100 | 100 | 100 | 100 | 100 |
| Alopecurus myosuroides | 25 | 95 | 45 | 90 | 90 | 100 | 95 | 100 | 100 |
| Poa annua | 30 | 100 | 45 | 90 | 85 | 95 | 90 | 100 | 100 |

0 = no damage
100 = complete destruction

EXAMPLE 4

In the open the plants beet (*Beta vulgaris*), wild mustard (*Sinapis arvensis*), common lambsquarters (*Chenopodium album*), chamomile (*Matricaria chamomilla*), catchweed bedstraw (*Galium aparine*), slender foxtail (*Alopecurus myosuroides*), annual bluegrass (*Poa annua*) and barnyard grass (*Echinochloa crusgalli*) were treated at a growth height of 3 to 18 cm with the following amounts of the following active ingredients and compositions thereof, each active ingredient and the composition being emulsified in 500 liters of water per hectare:

I: 1-($\alpha,\alpha$-dimethyl-$\beta$-acetoxypropionyl)-3-cyclohexyl-5,6-trimethylene uracil, 0.5, 1, 1.5 and 2 kg/hectare;

II: 3-methoxycarbonylaminophenyl-N-(3'-methylphenyl)-carbamate, 0.5, 1, 1.5 and 2 kg/hectare;

I+II:
1 + 1 kg/hectare;
0.5 +1.5 kg/hectare;
1.5 + 0.5 kg/hectare.

After 6 to 10 days it was ascertained that the compositions had a stronger herbicidal action than their individual components:

I: 1-phenyl-4-amino-5-chloropyridazone-(6), 0.2, 0.25, 0.5, 0.75, 1 and 1.2 kg/hectare;

II: 1-ethoxy-2,3-dihydro-3,3-dimethyl-5-benzofuranylmethane sulfonate, 0.2, 0.25, 0.5, 0.75, 1 and 1.2 kg/hectare;

I+II:
0.25 + 0.75 kg/hectare; 0.5 + 0.5 kg/hectare; 0.75 + 0.25 kg/hectare.

After 3 to 4 weeks it was ascertained that the compositions had a better herbicidal action than their individual components, compared with the same good crop plant compatibility.

The results are given below:

| Active ingredient kg/ha | | | I | | | |
|---|---|---|---|---|---|---|
| | 0.2 | 0.25 | 0.5 | 0.75 | 1 | 1.2 |
| Beta vulgaris | 0 | 0 | 0 | 0 | 0 | 0 |
| Zea mays | 0 | 0 | 0 | 0 | 0 | 0 |
| Chenopodium album | 8 | 10 | 25 | 30 | 40 | 42 |
| Galium aparine | 8 | 10 | 15 | 30 | 40 | 42 |
| Galinsoga parviflora | 8 | 10 | 20 | 25 | 30 | 32 |
| Matricaria chamomilla | 13 | 15 | 30 | 40 | 50 | 52 |
| Polygonum persicaria | 8 | 10 | 20 | 35 | 30 | 32 |
| Sinapis arvensis | 8 | 10 | 20 | 30 | 45 | 47 |
| Alopecurus | | | | | | |

| Active ingredient | I | | | | II | | | | I+II 0.5+ | 1.5+ |
|---|---|---|---|---|---|---|---|---|---|---|
| kg/ha | 0.5 | 1 | 1.5 | 2 | 0.5 | 1 | 1.5 | 2 | 1+1 | 1.5 | 0.5 |
| Beta vulgaris | 0 | 0 | 5 | 20 | 0 | 0 | 10 | 25 | 0 | 10 | 5 |
| Sinapis arvensis | 25 | 45 | 60 | 95 | 25 | 40 | 70 | 95 | 100 | 100 | 100 |
| Chenopodium album | 20 | 40 | 55 | 85 | 30 | 50 | 80 | 100 | 100 | 100 | 100 |
| Matricaria chamomilla | 30 | 50 | 75 | 95 | 20 | 30 | 60 | 85 | 100 | 100 | 100 |
| Galium aparine | 25 | 40 | 60 | 85 | 15 | 30 | 50 | 70 | 95 | 95 | 100 |
| Alopecurus myosuroides | 25 | 45 | 75 | 95 | 5 | 10 | 15 | 20 | 85 | 75 | 100 |
| Poa annua | 20 | 40 | 65 | 90 | 5 | 10 | 15 | 20 | 80 | 70 | 95 |
| Echinochloa crus-galli | 20 | 40 | 60 | 85 | 10 | 15 | 20 | 30 | 85 | 70 | 95 |

0 = no damage
100 = complete destruction

EXAMPLE 5

An agricultural plot was sown with seeds of the plants given in the table below. The soil was then immediately treated with the following amounts of the following active ingredients and compositions thereof:

| | | | | | | |
|---|---|---|---|---|---|---|
| myosuroides | 2 | 3 | 6 | 9 | 11 | 13 |
| Avena fatua | 2 | 3 | 5 | 8 | 10 | 12 |
| Echinochloa crus-galli | 3 | 5 | 8 | 10 | 13 | 15 |

0 = no damage
100 = complete destruction

| Active ingredient kg/ha | | | II | | | |
|---|---|---|---|---|---|---|
| | 0.2 | 0.25 | 0.5 | 0.75 | 1 | 1.2 |
| Beta vulgaris | 0 | 0 | 0 | 0 | 0 | 0 |
| Zea mays | 0 | 0 | 0 | 0 | 0 | 0 |
| Chenopodium album | 2 | 3 | 5 | 8 | 10 | 13 |
| Galium aparine | 4 | 6 | 10 | 14 | 20 | 22 |
| Galinsoga parviflora | 1 | 2 | 5 | 8 | 10 | 11 |
| Matricaria chamomilla | 4 | 5 | 9 | 16 | 22 | 24 |
| Polygonum persicaria | 3 | 5 | 8 | 14 | 18 | 20 |
| Sinapis arvensis | 2 | 3 | 5 | 8 | 10 | 11 |

−Continued

| Active ingredient kg/ha | 0.2 | 0.25 | II 0.5 | 0.75 | 1 | 1.2 |
|---|---|---|---|---|---|---|
| Alopecurus myosuroides | 8 | 10 | 15 | 30 | 45 | 47 |
| Avena fatua | 8 | 10 | 20 | 30 | 40 | 41 |
| Echinochloa crus-galli | 12 | 15 | 30 | 40 | 50 | 52 |

| Active ingredient kg/ha | I+II 0.25+ 0.75 | I+II 0.5+ 0.5 | I+II 0.75+ 0.25 | I+II 0.2+1 | I+II 1+0.2 |
|---|---|---|---|---|---|
| Beta vulgaris | 0 | 0 | 0 | 0 | 0 |
| Zea mays | 0 | 0 | 0 | 0 | 0 |
| Chenopodium album | 25 | 35 | 40 | 25 | 48 |
| Galium aparine | 30 | 30 | 45 | 33 | 50 |
| Galinsoga parviflora | 25 | 30 | 35–40 | 22 | 35 |
| Matricaria chamomilla | 35 | 45 | 50 | 40 | 58 |
| Polygonum persicaria | 28 | 35 | 45 | 32 | 39 |
| Sinapis arvensis | 25 | 30 | 60 | 22 | 53 |
| Alopecurus myosuroides | 40 | 25 | 25 | 53 | 25 |
| Avena fatua | 38 | 30 | 22 | 46 | 23 |
| Echinochloa crus-galli | 50 | 42 | 30 | 60 | 30 |

0 = no damage
100 = complete destruction

EXAMPLE 6

An agricultural plot was sown with seeds of the plants listed below. The soil was then immediately treated with the following amounts of the following active ingredients and compositions thereof:

I: 1-phenyl-4-amino-5-chloropyridazone-(6), 1, 5 and 6 kg/hectare;

II: 1-ethoxy-2,3-dihydro-3,3-dimethyl-5-benzofuranylmethane sulfonate, 1, 5 and 6 kg/hectare;

III: N-4-(4'-chlorophenoxy)-phenyl-N',N'-dimethylurea, 1, 5 and 6 kg/hectare;

I+II:

1 + 5 kg/hectare;
5 + 1 kg/hectare;

I+III: 1 + 5 kg/hectare (not according to the invention)

After 3 to 4 weeks it was ascertained that the composition of I + II had a better herbicidal action than its individual components and the composition of I + III (non-inventive), combined with the same good crop plant compatibility.

The results are given below:

EXAMPLE 7

In the greenhouse various plants were treated at a growth height of from 3 to 11 cm with the following amounts of the following individual active ingredients and compositions thereof as oil dispersions:

I: 2-ethoxy-2,3-dihydro-3,3-dimethyl-5-benzofuranylmethanesulfonate, 0.25, 0.5, 0.75 and 1.0 kg/ha;

II: 1-phenyl-4-amino-5-chloropyridazone-(6), 0.25, 0.5, 0.75 and 1.0 kg/ha;

III: 3-cyclohexyl-5,6-trimethylene uracil, 0.25, 0.5, 0.75 and 1.0 kg/ha;

I + II: 0.25 + 0.25, 0.25 + 0.75 and 0.75 + 0.25 kg/ha;
I + III: 0.25 + 0.25, 0.25 + 0.75 and 0.75 + 0.25 kg/ha.

After 2 to 3 weeks it was ascertained that the compositions had a better herbicidal action than their individual components, combined with the same good crop plant compatibility.

The results of this experiment are given below:

| Active ingredient kg/ha | I 0.25 | 0.5 | 0.75 | 1.0 |
|---|---|---|---|---|
| Crop plants: | | | | |
| Beta vulgaris | 0 | 0 | 0 | 0 |
| Unwanted plants: | | | | |
| Avena fatua | 18 | 30 | 40 | 55 |
| Bromus tectorum | 30 | 35 | 43 | 60 |

| Active ingredient kg/ha | II 6 | 5 | 1 | 6 | I 5 | 1 | 6 | III 5 | 1 |
|---|---|---|---|---|---|---|---|---|---|
| Beta vulgaris | 40 | 20 | 0 | 5 | 0 | 0 | 100 | 80 | 20 |
| Chenopodium album | 55 | 45 | 10 | 100 | 100 | 40 | 100 | 100 | 20 |
| Galium aparine | 80 | 80 | 20 | 100 | 100 | 40 | 100 | 90 | 15 |
| Galinsoga parviflora | 60 | 50 | 10 | 100 | 100 | 30 | 85 | 80 | 15 |
| Matricaria chamomilla | 90 | 80 | 22 | 100 | 100 | 50 | 100 | 100 | 20 |
| Polygonum persicaria | 80 | 70 | 18 | 100 | 100 | 30 | 100 | 100 | 20 |
| Sinapis arvensis | 60 | 50 | 10 | 100 | 100 | 45 | 95 | 90 | 15 |
| Alopecurus myosuroides | 100 | 100 | 45 | 60 | 50 | 11 | 70 | 60 | 10 |

| Active ingredient kg/ha | II 6 | 5 | 1 | 6 | I 5 | 1 | 6 | III 5 | 1 |
|---|---|---|---|---|---|---|---|---|---|
| Avena fatua | 100 | 100 | 40 | 55 | 45 | 10 | 80 | 70 | 15 |
| Echinochloa crus-galli | 100 | 100 | 50 | 70 | 60 | 13 | 70 | 60 | 10 |

| Active ingredient kg/ha | I+II 1+5 | I+II 5+1 | I+III 1+5 |
|---|---|---|---|
| Beta vulgaris | 20 | 0 | 80 |
| Chenopodium album | 90 | 100 | 100 |
| Galium aparine | 100 | 100 | 100 |
| Galinsoga parviflora | 90 | 100 | 100 |
| Matricaria chamomilla | 100 | 100 | 100 |
| Polygonum persicaria | 100 | 100 | 100 |
| Sinapis arvensis | 100 | 100 | 100 |
| Alopecurus myosuroides | 100 | 100 | 80 |
| Avena fatua | 100 | 100 | 90 |
| Echinochloa crus-galli | 100 | 100 | 80 |

0 = no damage
100 = complete destruction

-Continued

| Active ingredient kg/ha | I | | | |
|---|---|---|---|---|
| | 0.25 | 0.5 | 0.75 | 1.0 |
| Matricaria chamomilla | 15 | 23 | 27 | 34 |
| Setaria faberii | 33 | 49 | 55 | 60 |
| Sinapis arvensis | 8 | 15 | 20 | 24 |

0 = no damage
100 = complete destruction

| Active ingredient kg/ha | II | | | |
|---|---|---|---|---|
| | 0.25 | 0.5 | 0.75 | 1.0 |
| Crop plants: | | | | |
| Beta vulgaris | 0 | 0 | 0 | 0 |
| Unwanted plants: | | | | |
| Avena fatua | 7 | 11 | 13 | 15 |
| Bromus tectorum | 5 | 10 | 16 | 25 |
| Matricaria chamomilla | 15 | 35 | 40 | 45 |
| Setaria fiberii | 8 | 11 | 15 | 25 |
| Sinapis arvensis | 23 | 34 | 38 | 40 |

0 = no damage
100 = complete destruction

| Active ingredient kg/ha | III | | | |
|---|---|---|---|---|
| | 0.25 | 0.5 | 0.75 | 1.0 |
| Crop plants: | | | | |
| Beta vulgaris | 0 | 0 | 0 | 0 |
| Unwanted plants: | | | | |
| Avena fatua | 10 | 15 | 25 | 35 |
| Bromus tectorum | 15 | 25 | 30 | 40 |
| Matricaria chamomilla | 15 | 24 | 35 | 45 |
| Setaria faberii | 20 | 24 | 30 | 40 |
| Sinapis arvensis | 25 | 35 | 40 | 70 |

0 = no damage
100 = complete destruction

| Active ingredient kg/ha | I+II | | |
|---|---|---|---|
| | 0.25+0.75 | 0.25+0.25 | 0.75+0.25 |
| Crop plants: | | | |
| Beta vulgaris | 0 | 0 | 0 |
| Unwanted plants: | | | |
| Avena fatua | 70 | 60 | 75 |
| Bromus tectorum | 85 | 60 | 70 |
| Matricaria chamomilla | 85 | 62 | 77 |
| Setaria faberii | 72 | 70 | 75 |
| Sinapis arvensis | 80 | 60 | 80 |

0 = no damage
100 = complete destruction

| Active ingredient kg/ha | I+III | | |
|---|---|---|---|
| | 0.25+0.75 | 0.25+0.25 | 0.75+0.25 |
| Crop plants: | | | |
| Beta vulgaris | 0 | 0 | 0 |
| Unwanted plants: | | | |
| Avena fatua | 75 | 60 | 82 |
| Bromus tectorum | 80 | 80 | 85 |
| Matricaria chamomilla | 76 | 62 | 72 |
| Setaria faberii | 80 | 83 | 95 |
| Sinapis arvensis | 80 | 65 | 80 |

0 = no damage
100 = complete destruction

EXAMPLE 8

In the greenhouse various plants were treated at a growth height of from 2 to 11 cm with the following amounts of the following individual active ingredients and compositions thereof as pastes:

I: 2-ethoxy-2,3-dihydro-3,3-dimethyl-5-benzofuranylmethanesulfonate, 0.15, 0.25, 0.5, 0.75, 1.0, 1.25, 1.5, 1.65, 2.0, 3.0 and 4.0 kg/ha;

II: 1-phenyl-4-amino-5-chloropyridazone-(6), 0.15, 0.25, 0.5, 0.75, 1.0, 1.25, 1.5, 1.65, 2.0, 3.0 and 4.0 kg/ha;

III: 3-cyclohexyl-5,6-trimethylene uracil, 0.15, 0.25, 0.5, 0.75, 1.0, 1.25, 1.5, 1.65, 2.0, 3.0 and 4.0 kg/ha;

IV: N-(4-bromophenyl)-N'-methoxy-N'-methylurea, 3 and 4 kg/ha;

I+II: 0.25+0.75, 0.25+0.25, 0.75+0.25, 0.5+0.5, 0.25+1.25, 1.25+0.25, 0.75+0.75, 1.5+0.15, 0.15+1.5, 3.0+1.0, 1.0+1.0 and 1.0+3.0 kg/ha;

I+III: 0.25+0.75, 0.25+0.25, 0.75+0.25, 0.5+0.5, 0.25+1.25, 1.25+0.25, 0.75+0.75, 1.5+0.15, 0.15+1.5, 3.0+1.0, 1.0+1.0 and 1.0+3.0 kg/ha;

I+IV: 1.0+3.0 kg/ha.

After 2 to 3 weeks it was ascertained that compositions I+II and I+III had a better herbicidal action than the individual ingredients I, II and III combined with the same good crop plant compatibility, and better crop plant compatibility than active ingredients IV and the composition I + IV.

The results are given below:

| Active ingredient kg/ha | I | | | | | | | | | | |
|---|---|---|---|---|---|---|---|---|---|---|---|
| | 0.15 | 0.25 | 0.5 | 0.75 | 1.0 | 1.25 | 1.5 | 1.65 | 2.0 | 3.0 | 4.0 |
| Crop plants: | | | | | | | | | | | |
| Beta vulgaris | 0 | 0 | 0 | 0 | 0 | 0 | 5 | 10 | 20 | 30 | 35 |
| Unwanted plants: | | | | | | | | | | | |
| Avena fatua | 10 | 15 | 25 | 35 | 50 | 60 | 60 | 65 | 70 | 80 | 100 |
| Bromus tectorum | 15 | 25 | 30 | 40 | 55 | 58 | 63 | 64 | 75 | 80 | 100 |
| Matricaria chamomilla | 5 | 10 | 20 | 23 | 30 | 35 | 50 | 60 | 70 | 90 | 100 |
| Setaria faberii | 10 | 30 | 35 | 45 | 55 | 60 | 70 | 70 | 90 | 100 | 100 |
| Sinapis arvensis | 3 | 5 | 10 | 15 | 20 | 28 | 40 | 50 | 60 | 90 | 100 |

0 = no damage
100 = complete destruction

| Active ingredient kg/ha | II | | | | | | | | | | |
|---|---|---|---|---|---|---|---|---|---|---|---|
| | 0.15 | 0.25 | 0.5 | 0.75 | 1.0 | 1.25 | 1.5 | 1.65 | 2.0 | 3.0 | 4.0 |
| Crop plants: | | | | | | | | | | | |
| Beta vulgaris | 0 | 0 | 0 | 0 | 0 | 0 | 0 | 0 | 0 | 0 | 10 |
| Unwanted plants: | | | | | | | | | | | |
| Avena fatua | 1 | 3 | 5 | 8 | 10 | 12 | 15 | 18 | 25 | 30 | 45 |
| Bromus tectorum | 0 | 5 | 11 | 15 | 20 | 22 | 28 | 29 | 30 | 35 | 70 |
| Matricaria chamomilla | 7 | 10 | 30 | 35 | 40 | 45 | 50 | 52 | 60 | 90 | 100 |
| Setaria faberii | 1 | 3 | 8 | 10 | 20 | 25 | 30 | 30 | 33 | 40 | 50 |
| Sinapis arvensis | 15 | 20 | 30 | 33 | 35 | 40 | 44 | 45 | 50 | 85 | 100 |

0 = no damage
100 = complete destruction

| Active ingredients kg/ha | 0.15 | 0.25 | 0.5 | III 0.75 | 1.0 | 1.25 | 1.5 | 1.65 | 2.0 | 3.0 | 4.0 | IV 3.0 | 4.0 |
|---|---|---|---|---|---|---|---|---|---|---|---|---|---|
| Crop plants: | | | | | | | | | | | | | |
| Beta vulgaris | 0 | 0 | 0 | 0 | 0 | 0 | 5 | 10 | 25 | 30 | 50 | 100 | 100 |
| Unwanted plants: | | | | | | | | | | | | | |
| Avena fatua | 3 | 5 | 10 | 20 | 30 | 35 | 45 | 60 | 75 | 85 | 100 | 100 | 100 |
| Bromus tectorum | 5 | 10 | 20 | 25 | 35 | 40 | 50 | 60 | 75 | 90 | 100 | 100 | 100 |
| Matricaria chamomilla | 5 | 10 | 20 | 30 | 40 | 45 | 60 | 75 | 90 | 100 | 100 | 100 | 100 |
| Setaria faberii | 5 | 15 | 20 | 25 | 35 | 40 | 55 | 60 | 70 | 80 | 90 | 100 | 100 |
| Sinapis arvensis | 15 | 20 | 30 | 35 | 65 | 75 | 85 | 90 | 100 | 100 | 100 | 100 | 100 |

0 = no damage
100 = complete destruction

| Active ingredient kg/ha | 0.25+0.75 | 0.25+0.25 | I+II 0.75+0.25 | 0.5+0.5 | 0.25+1.25 | 1.25+0.25 |
|---|---|---|---|---|---|---|
| Crop plants: | | | | | | |
| Beta vulgaris | 0 | 0 | 0 | 0 | 0 | 0 |
| Unwanted plants: | | | | | | |
| Avena fatua | 65 | 40 | 70 | 65 | 75 | 90 |
| Bromus tectorum | 75 | 50 | 75 | 73 | 85 | 93 |
| Matricaria chamomilla | 70 | 45 | 60 | 70 | 80 | 70 |
| Setaria faberii | 75 | 55 | 75 | 65 | 90 | 93 |
| Sinapis arvensis | 70 | 50 | 70 | 60 | 70 | 65 |

0 = no damage
100 = complete destruction

| Active ingredient kg/ha | 0.75+0.75 | I+II 1.5+0.15 | 0.15+1.5 |
|---|---|---|---|
| Crop plants: | | | |
| Beta vulgaris | 0 | 5 | 0 |
| Unwanted plants: | | | |
| Avena fatua | 80 | 90 | 85 |
| Bromus tectorum | 78 | 85 | 80 |
| Matricaria chamomilla | 80 | 85 | 95 |
| Setaria faberii | 85 | 100 | 90 |
| Sinapis arvensis | 72 | 80 | 70 |

0 = no damage
100 = complete destruction

EXAMPLE 9

An agricultural plot was sown with the seeds of various plants. The soil prepared in this manner was then immediately treated with the following amounts of the following individual active ingredients and compositions thereof as dispersions or emulsions:

I: 2-ethoxy-2,3-dihydro-3,3-dimethyl-5-benzofuranylmethane sulfonate 0.15, 0.25, 0.5, 0.75, 1.0, 1.25, 1.5, 1.65, 2.0, 3.0 and 4.0 kg/ha;

II: 1-phenyl-4-amino-5-chloropyridazone-(6) 0.15,

| Active ingredient kg/ha | 3.0+1.0 | I+II 1.0+1.0 | 1.0+3.0 | 0.25+0.75 | I+III 0.25+0.25 | 0.75+0.25 | 0.5+0.5 |
|---|---|---|---|---|---|---|---|
| Crop plants: | | | | | | | |
| Beta vulgaris | 30 | 0 | 0 | 0 | 0 | 0 | 0 |
| Unwanted plants: | | | | | | | |
| Avena fatua | 100 | 100 | 100 | 70 | 50 | 65 | 65 |
| Bromus tectorum | 100 | 90 | 100 | 75 | 55 | 70 | 75 |
| Matricaria chamomilla | 100 | 95 | 100 | 60 | 45 | 55 | 60 |
| Setaria faberii | 100 | 95 | 100 | 80 | 65 | 85 | 75 |
| Sinapis arvensis | 100 | 95 | 100 | 90 | 50 | 70 | 80 |

0 = no damage
100 = complete destruction

| Active ingredient kg/ha | 0.25+1.25 | 1.25+0.25 | I+III 0.75+0.75 | 1.5+1.5 | 0.15+1.5 |
|---|---|---|---|---|---|
| Crop plants: | | | | | |
| Beta vulgaris | 0 | 0 | 0 | 5 | 3 |
| Unwanted plants: | | | | | |
| Avena fatua | 82 | 90 | 80 | 100 | 85 |
| Bromus tectorum | 90 | 88 | 85 | 95 | 90 |
| Matricaria chamomilla | 80 | 85 | 83 | 100 | 95 |
| Setaria faberii | 95 | 90 | 95 | 100 | 100 |
| Sinapis arvensis | 96 | 94 | 100 | 100 | 100 |

0 = no damage
100 = complete destruction

| Active ingredient kg/ha | 3.0+1.0 | I+III 1.0+1.0 | 1.0+3.0 | I+IV 1.0+3.0 |
|---|---|---|---|---|
| Crop plants: | | | | |
| Beta vulgaris | 30 | 0 | 30 | 100 |
| Unwanted plants: | | | | |
| Avena fatua | 100 | 95 | 100 | 100 |
| Bromus tectorum | 100 | 100 | 100 | 100 |
| Matricaria chamomilla | 100 | 100 | 100 | 100 |
| Setaria faberii | 100 | 100 | 100 | 100 |
| Sinapis arvensis | 100 | 100 | 100 | 100 |

0 = no damage
100 = complete destruction 0.25, 0.5, 0.75, 1.0, 1.25, 1.5, 1.65, 2.0, 3.0 and 4.0 kg/ha;

III: 3-cyclohexyl-5,6-trimethylene uracil 0.15, 0.25, 0.5, 0.75, 1.0, 1.25, 1.5, 1.65, 2.0, 3.0 and 4.0 kg/ha;

IV: N-(4-bromophenyl)-N'-methoxy-N'-methylurea 3 and 4 kg/ha;

I+II: 0.25+0.75, 0.22+0.25, 0.75+0.25, 0.5+0.5, 0.25+1.25, 1.25+0.25, 0.75+0.75, 1.5+0.15, 0.15+1.5, 3.0+1.0, and 1.0+3.0 kg/ha;

I+III: 0.25+0.75, 0.25+0.25, 0.75+0.25, 0.5+0.5, 0.25+1.25, 1.25+0.25, 0.75+0.75, 1.5+0.15, 0.15+1.5, 3.0+1.0, 1.0+1.0 and 1.0+3.0 kg/ha;

I+IV: 1.0+3.0 kg/ha.

After 3 to 4 weeks it was ascertained that compositions I+II and I+III had a better herbicidal action than the individual active ingredients I, II and III combined with the same good crop plant compatibility, and better crop plant compatibility than active ingredient IV and the composition I+IV.

The results are given below:

| Active ingredient kg/ha | I | | | | | | | | | | |
|---|---|---|---|---|---|---|---|---|---|---|---|
| | 0.15 | 0.25 | 0.5 | 0.75 | 1.0 | 1.25 | 1.5 | 1.65 | 2.0 | 3.0 | 4.0 |
| Crop plants: | | | | | | | | | | | |
| Beta vulgaris | 0 | 0 | 0 | 0 | 0 | 2 | 5 | 6 | 10 | 20 | 30 |
| Unwanted plants: | | | | | | | | | | | |
| Avena fatua | 2 | 5 | 16 | 21 | 40 | 50 | 60 | 65 | 80 | 100 | 100 |
| Bromus tectorum | 3 | 5 | 14 | 18 | 25 | 30 | 35 | 37 | 50 | 70 | 100 |
| Matricaria chamomilla | 6 | 10 | 20 | 30 | 40 | 45 | 50 | 53 | 70 | 90 | 100 |
| Setaria faberii | 11 | 20 | 30 | 40 | 50 | 60 | 75 | 80 | 90 | 100 | 100 |
| Sinapis arvensis | 0 | 0 | 5 | 5 | 10 | 13 | 18 | 19 | 20 | 35 | 50 |
| 0 = no damage | | | | | | | | | | | |
| 100 = complete destruction | | | | | | | | | | | |

| Active ingredient kg/ha | II | | | | | | | | | | |
|---|---|---|---|---|---|---|---|---|---|---|---|
| | 0.15 | 0.25 | 0.5 | 0.75 | 1.0 | 1.25 | 1.5 | 1.65 | 2.0 | 3.0 | 4.0 |
| Crop plants: | | | | | | | | | | | |
| Beta vulgaris | 0 | 0 | 0 | 0 | 0 | 0 | 0 | 0 | 0 | 0 | 15 |
| Unwanted plants: | | | | | | | | | | | |
| Avena fatua | 0 | 0 | 2 | 5 | 6 | 8 | 15 | 15 | 18 | 20 | 30 |
| Bromus tectorum | 0 | 0 | 5 | 7 | 10 | 13 | 15 | 17 | 22 | 30 | 35 |
| Matricaria chamomilla | 7 | 8 | 10 | 18 | 25 | 30 | 45 | 47 | 60 | 90 | 100 |
| Setaria faberii | 4 | 6 | 10 | 14 | 20 | 25 | 35 | 37 | 40 | 60 | 65 |
| Sinapis arvensis | 10 | 15 | 20 | 25 | 30 | 35 | 50 | 55 | 60 | 70 | 80 |
| 0 = no damage | | | | | | | | | | | |
| 100 = complete destruction | | | | | | | | | | | |

| Active ingredient kg/ha | III | | | | | | | | | | |
|---|---|---|---|---|---|---|---|---|---|---|---|
| | 0.15 | 0.25 | 0.5 | 0.75 | 1.0 | 1.25 | 1.5 | 1.65 | 2.0 | 3.0 | 4.0 |
| Crop plants: | | | | | | | | | | | |
| Beta vulgaris | 0 | 0 | 0 | 0 | 0 | 0 | 0 | 0 | 10 | 40 | 50 |
| Unwanted plants: | | | | | | | | | | | |
| Avena fatua | 3 | 5 | 10 | 15 | 18 | 20 | 23 | 25 | 50 | 70 | 95 |
| Bromus tectorum | 12 | 18 | 25 | 35 | 40 | 50 | 60 | 65 | 75 | 100 | 100 |
| Matricaria chamomilla | 10 | 20 | 40 | 56 | 70 | 80 | 85 | 90 | 100 | 100 | 100 |
| Setaria faberii | 10 | 15 | 25 | 34 | 40 | 46 | 55 | 60 | 70 | 75 | 83 |
| Sinapis arvensis | 7 | 10 | 20 | 30 | 35 | 38 | 43 | 50 | 70 | 100 | 100 |
| 0 = no damage | | | | | | | | | | | |
| 100 = complete destruction | | | | | | | | | | | |

| Active ingredient kg/ha | IV | |
|---|---|---|
| | 3.0 | 4.0 |
| Crop plants: | | |
| Beta vulgaris | 100 | 100 |
| Unwanted plants: | | |
| Avena fatua | 100 | 100 |
| Bromus tectorum | 100 | 100 |
| Matricaria chamomilla | 100 | 100 |
| Setaria faberii | 80 | 100 |
| Sinapis arvensis | 100 | 100 |
| 0 = no damage | | |
| 100 = complete destruction | | |

| Active ingredient kg/ha | I+II | | | | | |
|---|---|---|---|---|---|---|
| | 0.25+0.75 | 0.25+0.25 | 0.75+0.25 | 0.5+0.5 | 0.25+1.25 | 1.25+0.25 |
| Crop plants: | | | | | | |
| Beta vulgaris | 0 | 0 | 0 | 0 | 0 | 2 |
| Unwanted plants: | | | | | | |
| Avena fatua | 45 | 30 | 55 | 45 | 90 | 95 |
| Bromus tectorum | 50 | 26 | 52 | 50 | 55 | 70 |
| Matricaria chamomilla | 80 | 50 | 70 | 82 | 85 | 80 |
| Setaria faberii | 85 | 70 | 70 | 65 | 90 | 95 |
| Sinapis arvensis | 55 | 40 | 50 | 53 | 80 | 75 |
| 0 = no damage | | | | | | |
| 100 = complete destruction | | | | | | |

| Active ingredients kg/ha | I+II | | | | | |
|---|---|---|---|---|---|---|
| | 0.75+0.75 | 1.5+0.15 | 0.15+1.5 | 3.0+1.0 | 1.0+1.0 | 1.0+3.0 |
| Crop plants: | | | | | | |
| Beta vulgaris | 0 | 5 | 0 | 20 | 0 | 0 |
| Unwanted plants: | | | | | | |
| Avena fatua | 85 | 80 | 70 | 100 | 95 | 100 |
| Bromus tectorum | 72 | 55 | 50 | 100 | 75 | 100 |
| Matricaria chamomilla | 88 | 80 | 75 | 100 | 95 | 100 |
| Setaria faberii | 85 | 97 | 92 | 100 | 100 | 100 |
| Sinapis arvensis | 82 | 70 | 80 | 95 | 85 | 100 |
| 0 = no damage | | | | | | |
| 100 = complete destruction | | | | | | |

| Active ingredients kg/ha | I+II 0.25+0.75 | 0.25+0.25 | 0.75+0.25 | 0.5+0.5 | 0.25+1.25 | 1.25+0.25 |
|---|---|---|---|---|---|---|
| Crop plants: | | | | | | |
| Beta vulgaris | 0 | 0 | 0 | 0 | 0 | 2 |
| Unwanted plants: | | | | | | |
| Avena fatua | 50 | 30 | 55 | 56 | 70 | 85 |
| Bromus tectorum | 70 | 52 | 68 | 70 | 80 | 85 |
| Matricaria chamomilla | 85 | 60 | 80 | 83 | 100 | 100 |
| Setaria faberii | 83 | 65 | 85 | 86 | 90 | 95 |
| Sinapis arvensis | 60 | 35 | 50 | 55 | 75 | 80 |

0 = no damage
100 = complete destruction

| Active ingredients kg/ha | I+III 0.75+0.75 | 1.5+0.15 | 0.15+1.5 | 3.0+1.0 | 1.0+1.0 | 1.0+3.0 | I+IV 1.0+3.0 |
|---|---|---|---|---|---|---|---|
| Crop plants: | | | | | | | |
| Beta vulgaris | 0 | 5 | 0 | 20 | 0 | 40 | 100 |
| Unwanted plants: | | | | | | | |
| Avena fatua | 80 | 90 | 80 | 100 | 95 | 100 | 100 |
| Bromus tectorum | 80 | 90 | 85 | 100 | 95 | 100 | 100 |
| Matricaria chamomilla | 100 | 100 | 100 | 100 | 100 | 100 | 100 |
| Setaria faberii | 92 | 95 | 100 | 100 | 100 | 100 | 100 |
| Sinapis arvensis | 76 | 75 | 70 | 95 | 70 | 100 | 100 |

0 = no damage
100 = complete destruction

EXAMPLE 10

An agricultural plot was sown with the seeds of various plants. The soil prepared in this manner was then immediately treated with the following amounts of the following active ingredients and compositions thereof in the form of granules:

I: 2-ethoxy-2,3-dihydro-3,3-dimemthyl-5-benzofuranylmethane sulfonate, 0.25, 0.5, 0.75 and 1.0 kg/ha;

II: 1-phenyl-4-amino-5-chloropyridazone-(6), 0.25, 0.5, 0.75 and 1.0 kg/ha;

III: 3-cyclohexyl-5,6-trimethylene uracil, 0.25, 0.5, 0.75 and 1.0 kg/ha;

I+II: 0.25+0.25, 0.25+0.75 and 0.75+0.25 kg/ha
I+III: 0.25+0.25, 0.25+0.75 and 0.75+0.25 kg/ha.

After 2 to 3 weeks it was ascertained that the compositions had a better herbicidal action than their individual components, combined with the same good crop plant compatibility.

The results are given below:

| Active ingredients kg/ha | I 0.25 | 0.5 | 0.75 | 1.0 | II 0.25 | 0.5 | 0.75 | 1.0 | III 0.25 | 0.5 | 0.75 | 1.0 |
|---|---|---|---|---|---|---|---|---|---|---|---|---|
| Crop plants: | | | | | | | | | | | | |
| Beta vulgaris | 0 | 0 | 0 | 0 | 0 | 0 | 0 | 0 | 0 | 0 | 0 | 0 |
| Unwanted plants: | | | | | | | | | | | | |
| Avena fatua | 5 | 16 | 21 | 40 | 0 | 2 | 5 | 6 | 5 | 10 | 15 | 18 |
| Bromus tectorum | 5 | 14 | 18 | 25 | 0 | 5 | 7 | 10 | 18 | 25 | 35 | 40 |
| Matricaria chamomilla | 10 | 20 | 30 | 40 | 8 | 10 | 18 | 25 | 20 | 40 | 56 | 70 |
| Setaria faberii | 20 | 30 | 40 | 50 | 6 | 10 | 14 | 20 | 15 | 25 | 34 | 40 |
| Sinapis arvensis | 0 | 5 | 5 | 10 | 15 | 20 | 25 | 30 | 10 | 20 | 30 | 35 |

0 = no damage
100 = complete destruction

| Active ingredient kg/ha | I+II 0.25+0.75 | 0.25+0.25 | 0.75+0.25 | I+III 0.25+0.75 | 0.25+0.25 | 0.75+0.25 |
|---|---|---|---|---|---|---|
| Crop plants: | | | | | | |
| Beta vulgaris | 0 | 0 | 0 | 0 | 0 | 0 |
| Unwanted plants: | | | | | | |
| Avena fatua | 45 | 30 | 55 | 50 | 30 | 55 |
| Bromus tectorum | 50 | 26 | 52 | 70 | 52 | 68 |
| Matricaria chamomilla | 80 | 50 | 70 | 85 | 60 | 80 |
| Setaria faberii | 85 | 7L | 70 | 83 | 65 | 85 |
| Sinapis arvensis | 55 | 40 | 50 | 60 | 35 | 50 |

0 = no damage
100 = complete destruction

EXAMPLE 11

In the greenhouse various plants were treated at a growth height of 3 to 11 cm with the following amounts of the following active ingredients and compositions thereof as dispersions:

I: 3-cyclohexyl-5,6-trimethylene uracil, 0.1, 1.0 and 1.2 kg/ha;

II: 3-methoxycarbonylaminophenyl-N-(3'-methylphenyl)-carbamate, 0.1, 1.0 and 1.2 kg/ha;

III: 1-phenyl-4-amino-5-chloropyridazone-(6), 0.1, 1.0 and 1.2 kg/ha;

I+II+III: 0.1+0.1+1.0, 0.1+1.0+0.1 and 1.0+0.1+0.1 kg/ha.

After 2 to 3 weeks it was ascertained that the compositions had a better herbicidal action than their individual components, combined with the same good crop plant compatibility.

the results are given below:

| Active ingredient kg/ha | I 0.1 | 1.0 | 1.2 | II 0.1 | 1.0 | 1.2 | III 0.1 | 1.0 | 1.2 |
|---|---|---|---|---|---|---|---|---|---|
| Crop plants: | | | | | | | | | |
| Beta vulgaris | 0 | 0 | 0 | 0 | 0 | 0 | 0 | 0 | 0 |
| Unwanted plants: | | | | | | | | | |
| Avena fatua | 2 | 30 | 34 | 2 | 20 | 23 | 1 | 10 | 11 |
| Bromus tectorum | 3 | 35 | 39 | 2 | 15 | 18 | 0 | 20 | 21 |
| Matricaria chamomilla | 4 | 40 | 43 | 5 | 35 | 39 | 5 | 40 | 44 |
| Setaria faberii | 3 | 35 | 38 | 3 | 20 | 23 | 1 | 20 | 24 |
| Sinapis arvensis | 12 | 65 | 73 | 8 | 75 | 81 | 13 | 35 | 39 |

0 = no damage
100 = complete destruction

| Active ingredient: kg/ha | I+II+III 0.1+0.1+1.0 | I+II+III 0.1+1.0+0.1 | I+II+III 1.0+0.1+0.1 |
|---|---|---|---|
| Crop plants: | | | |
| Beta vulgaris | 0 | 0 | 0 |
| Unwanted plants: | | | |
| Avena fatua | 60 | 58 | 70 |
| Bromus tectorum | 60 | 56 | 65 |
| Matricaria chamomilla | 75 | 73 | 76 |
| Setaria faberii | 65 | 60 | 73 |
| Sinapis arvensis | 100 | 100 | 95 |

0 = no damage
100 = complete destruction

EXAMPLE 12

In the greenhouse, various plants were treated at a growth height of 3 to 11 cm with the following amounts of the following active ingredients and compositions thereof as dusts:

I: 2-ethoxy-2,3-dihydro-3,3-dimethyl-5-benzofuranylmethane sulfonate, 0.1, 1.0 and 1.2 kg/ha;

II: 3-methoxycarbonylaminophenyl-N-(3'-methylphenyl)-carbamate, 0.1, 1.0 and 1.2 kg/ha;

III: 1-phenyl-4-amino-5-chloropyridazone-(6), 0.1, 1.0 and 1.2 kg/ha;

I+II+III: 0.1+0.1+1.0, 0.1+1.0+0.1 and 1.0+0.1+0.1 kg/ha.

After 2 to 3 weeks it was ascertained that the compositions had a better herbicidal action than their individual components, combined with the same good crop plant compatibility.

The results are given below:

| Active ingredient kg/ha | I 0.1 | 1.0 | 1.2 | II 0.1 | 1.0 | 1.2 | III 0.1 | 1.0 | 1.2 |
|---|---|---|---|---|---|---|---|---|---|
| Crop plants: | | | | | | | | | |
| Beta vulgaris | 0 | 0 | 0 | 0 | 0 | 0 | 0 | 0 | 0 |
| Unwanted plants: | | | | | | | | | |
| Avena fatua | 8 | 50 | 56 | 2 | 20 | 23 | 1 | 10 | 11 |
| Bromus tectorum | 12 | 55 | 57 | 2 | 15 | 18 | 0 | 20 | 21 |
| Matricaria chamomilla | 3 | 30 | 33 | 5 | 35 | 39 | 5 | 40 | 44 |
| Setaria faberii | 8 | 55 | 58 | 3 | 20 | 23 | 1 | 20 | 24 |
| Sinapis arvensis | 1 | 20 | 26 | 8 | 75 | 81 | 13 | 35 | 39 |

0 = no damage
100 = complete destruction

| Active ingredient kg/ha | I+II+III 0.1+0.1+1.0 | I+II+III 0.1+1.0+0.1 | I+II+III 1.0+0.1+0.1 |
|---|---|---|---|
| Crop plants: | | | |
| Beta vulgaris | 0 | 0 | 0 |
| Unwanted plants: | | | |
| Avena fatua | 78 | 80 | 90 |
| Bromus tectorum | 87 | 90 | 95 |
| Matricaria chamomilla | 90 | 85 | 65 |
| Setaria faberii | 80 | 83 | 95 |
| Sinapis arvensis | 100 | 95 | 75 |

0 = no damage
100 = complete destruction

EXAMPLE 13

In the greenhouse, various plants were treated at a growth height of 3 to 12 cm with the following amounts of the following active ingredients and compositions thereof as emulsions:

I: 3-cyclohexyl-5,6-trimethylene uracil, 0.1, 0.25, 0.5, 0.75, 1.0 and 1.1 kg/ha;

II: 3-methoxycarbonylaminophenyl-N-(3'-methylphenyl)-carbamate, 0.1, 0.25, 0.5, 0.75, 1.0 and 1.1 kg/ha;

I+II: 0.25+0.25, 0.25+0.75, 0.75+0.25, 0.5+0.5, 0.1+1.0 and 1.0+0.1 kg/ha.

After 2 to 3 weeks it was ascertained that the compositions had a better herbicidal action than their individual components, combined with the same good crop plant compatibility.

The results are given below:

| Active ingredients kg/ha | I | | | | | | II | | | | |
|---|---|---|---|---|---|---|---|---|---|---|---|
| | 0.1 | 0.25 | 0.5 | 0.75 | 1.0 | 1.1 | 0.1 | 0.25 | 0.5 | 0.75 | 1.0 | 1.1 |
| Crop plants: | | | | | | | | | | | | |
| Beta vulgaris | 0 | 0 | 0 | 0 | 0 | 0 | 0 | 0 | 0 | 0 | 0 | 0 |
| Unwanted plants: | | | | | | | | | | | | |
| Avena fatua | 2 | 5 | 10 | 20 | 30 | 32 | 2 | 5 | 10 | 15 | 20 | 22 |
| Bromus tectorum | 3 | 10 | 20 | 25 | 35 | 37 | 2 | 3 | 8 | 12 | 15 | 16 |
| Matricaria chamomilla | 4 | 10 | 20 | 30 | 40 | 42 | 5 | 10 | 18 | 25 | 35 | 38 |
| Setaria faberii | 3 | 15 | 20 | 25 | 35 | 37 | 3 | 6 | 10 | 15 | 20 | 21 |
| Sinapis arvensis | 12 | 20 | 30 | 35 | 65 | 68 | 8 | 16 | 35 | 50 | 75 | 80 |

0 = no damage
100 = complete destruction

| Active ingredients kg/ha | I+II | | | | | |
|---|---|---|---|---|---|---|
| | 0.25+0.25 | 0.25+0.75 | 0.75+0.25 | 0.5+0.5 | 0.1+1.0 | 1.0+0.1 |
| Crop plants: | | | | | | |
| Beta vulgaris | 0 | 0 | 0 | 0 | 0 | 0 |
| Unwanted plants: | | | | | | |
| Avena fatua | 30 | 55 | 60 | 50 | 50 | 60 |
| Bromus tectorum | 40 | 60 | 63 | 61 | 55 | 65 |
| Matricaria chamomilla | 45 | 65 | 70 | 62 | 75 | 78 |
| Setaria faberii | 46 | 68 | 70 | 65 | 67 | 70 |
| Sinapis arvensis | 60 | 95 | 85 | 93 | 100 | 100 |

0 = no damage
100 = complete destruction

EXAMPLE 14

In the greenhouse various plants were treated at a growth height of 4 to 12 cm with the following amounts of the following active ingredients and compositions thereof as concentrated spray liquors:

I: 2-ethoxy-2,3-dihydro-3,3-dimethyl-5-benzofuranylmethane sulfonate, 0.1, 0.5, 0.9 and 1.0 kg/ha;

II: 3-methoxycarbonylaminophenyl-N-(3'-methylphenyl)-carbamate, 0.1, 0.5, 0.9 and 1.0 kg/ha;

I+II: 0.1+0.9, 0.9+0.1 and 0.5+0.5 kg/ha.

After 2 to 3 weeks it was ascertained that the compositions had a better herbicidal action than their individual components, combined with the same good crop plant compatibility.

The results are given below:

| Active ingredients kg/ha | I | | | | II | | | | III | | |
|---|---|---|---|---|---|---|---|---|---|---|---|
| | 0.1 | 0.5 | 0.9 | 1.0 | 0.1 | 0.5 | 0.9 | 1.0 | 0.1+0.9 | 0.9+0.1 | 0.5+0.5 |
| Crop plants: | | | | | | | | | | | |
| Beta vulgaris | 0 | 0 | 0 | 0 | 0 | 0 | 0 | 0 | 0 | 0 | 0 |
| Unwanted plants: | | | | | | | | | | | |
| Avena fatua | 8 | 25 | 48 | 50 | 2 | 10 | 19 | 20 | 80 | 90 | 70 |
| Bromus tectorum | 12 | 30 | 50 | 55 | 2 | 8 | 14 | 15 | 85 | 95 | 80 |
| Matricaria chamomilla | 3 | 20 | 28 | 30 | 5 | 18 | 33 | 35 | 70 | 60 | 68 |
| Setaria berii | 8 | 35 | 52 | 55 | 3 | 10 | 19 | 20 | 88 | 96 | 86 |
| Sinapis arvensis | 1 | 10 | 18 | 20 | 8 | 35 | 72 | 75 | 100 | 80 | 80 |

0 = no damage
100 = complete destruction

I claim:

1. A herbicide composition comprising a herbicidally effective amount of a mixture of
a a compound of the formula

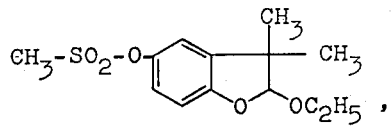

and
b a compound of the formula

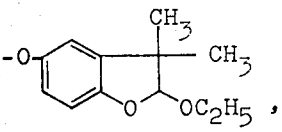

where Y denotes chloro or bromo, X denotes amino, in a weight of a to b in the range of 10:1 to 1:10.

2. A herbicide composition as claimed in claim 1, wherein said weight ratio is 3:1 to 1:3.

3. A herbicide composition as claimed in claim 1, wherein compound b is 1-phenyl-4-amino-5-chloropyridazone-(6).

4. A herbicide composition as claimed in claim 3, wherein said weight ratio is 3:1 to 1:3.

5. A process for suppressing growth of undesired or weed plants in crop plants which comprises applying to the host soil for said plants a herbicidally effective amount of a mixture of
a a compound of the formula and
b a compound of the formula

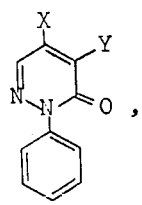

where Y denotes chloro or bromo, X denotes amino, in a weight ratio of *a* to *b* in the range of 10:1 to 1:10.

6. A process as claimed in claim 5, wherein said weight ratio is 5:1 to 1:5.

7. A process as claimed in claim 5, wherein compound *b* is 1-phenyl-4-amino-5-chloropyridazone-(6).

8. A process as claimed in claim 7, wherein said weight ratio is 3:1 to 1:3.

9. A herbicide composition comprising a herbicidally effective amount of a mixture of
a a compound of the formula

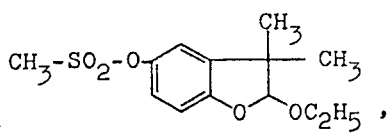

and
b a compound of the formula

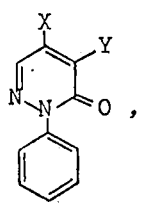

where Y denotes chloro or bromo, X denotes —NH—CHOH—CCL$_3$, in a weight ratio of *a* to *b* in the range of 1:1 to 1:3.

10. A process for suppressing growth of undesired or weed plants in crop plants which comprises applying to the plants themselves a herbicidally effective amount of a mixture of
a a compound of the formula

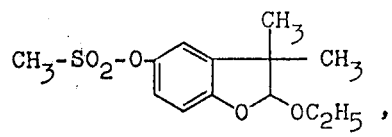

and
b a compound of the formula

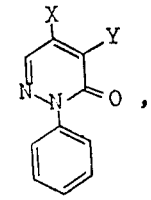

where Y denotes chloro or bromo, X denotes amino, in a weight ratio of *a* to *b* in the range of 10:1 to 1:10.

11. A process as claimed in claim 10, wherein said weight ratio is 3:1 to 1:3.

12. A process as claimed in claim 10, wherein compound b is 1-phenyl-4-amino-5-chloropyridazone-(6).

13. A process as claimed in claim 12, wherein said weight ratio is 3:1 to 1:3.

* * * * *